(12) United States Patent
Martin et al.

(10) Patent No.: US 9,731,556 B2
(45) Date of Patent: Aug. 15, 2017

(54) NON-PNEUMATIC TIRE INCLUDING SUPPORT MEMBERS HAVING TENSION MEMBER

(71) Applicant: CATERPILLAR INC., Peoria, IL (US)

(72) Inventors: Kevin L. Martin, Washburn, IL (US); David J. Colantoni, Metamora, IL (US)

(73) Assignee: Caterpillar, Inc., Peoria, IL (US)

( * ) Notice: Subject to any disclaimer, the term of this patent is extended or adjusted under 35 U.S.C. 154(b) by 45 days.

(21) Appl. No.: 14/839,278

(22) Filed: Aug. 28, 2015

(65) Prior Publication Data

US 2017/0057287 A1  Mar. 2, 2017

(51) Int. Cl.
*B60C 7/14* (2006.01)
*B60B 9/26* (2006.01)

(52) U.S. Cl.
CPC .............. *B60C 7/14* (2013.01); *B60B 9/26* (2013.01); *B60B 2360/32* (2013.01); *B60B 2900/111* (2013.01); *B60B 2900/313* (2013.01); *B60C 2007/146* (2013.04)

(58) Field of Classification Search
CPC .. B60C 7/14; B60C 7/143; B60C 7/16; B60C 7/18; B60C 2007/146; B60B 9/26
See application file for complete search history.

(56) References Cited

U.S. PATENT DOCUMENTS

| | | | | |
|---|---|---|---|---|
| 561,892 A | * | 6/1896 | Jacobs | B60B 9/26 152/85 |
| 606,934 A | * | 7/1898 | O'Brien | B60B 9/26 152/12 |
| 973,569 A | * | 10/1910 | Schmidt | B60B 9/26 152/72 |
| 1,021,440 A | * | 3/1912 | Arnold et al. | B60B 9/26 152/84 |
| 1,111,204 A | * | 9/1914 | Youngkvist | B60B 9/26 152/70 |
| 6,698,480 B1 | | 3/2004 | Cornellier | |
| 7,418,988 B2 | | 9/2008 | Cron et al. | |
| 7,650,919 B2 | | 1/2010 | Rhyne et al. | |
| 8,104,524 B2 | | 1/2012 | Manesh et al. | |
| 8,109,308 B2 | | 2/2012 | Manesh et al. | |

(Continued)

FOREIGN PATENT DOCUMENTS

| | | |
|---|---|---|
| CN | 103317961 A | 9/2013 |
| EP | 2170626 A1 | 4/2010 |
| KR | 10-2013-0037808 | 4/2013 |

*Primary Examiner* — Kip T Kotter
(74) *Attorney, Agent, or Firm* — Finnegan, Henderson, Farabow, Garrett & Dunner, LLP

(57) ABSTRACT

A non-pneumatic tire may include a hub configured to be coupled to a machine, an outer circumferential barrier radially spaced from the hub and configured to be associated with a tread portion of the tire, and a plurality of support members extending between the hub and the outer circumferential barrier and being configured to support a load on the hub in tension. At least some of the plurality of support members may include at least one tension member coupled to one of the hub and the outer circumferential barrier, and an intermediate member coupled to the at least one tension member and one of the hub and the outer circumferential barrier. The at least one tension member may be configured not to transmit compressive load to the intermediate member.

19 Claims, 8 Drawing Sheets

(56) References Cited

U.S. PATENT DOCUMENTS

| | | |
|---|---|---|
| 8,176,957 B2 | 5/2012 | Manesh et al. |
| 8,944,125 B2* | 2/2015 | Manesh .................. B60C 7/12 |
| | | 152/326 |
| 8,962,120 B2* | 2/2015 | Delfino .................. B60B 9/02 |
| | | 152/43 |
| 2004/0012246 A1* | 1/2004 | Rhyne .................. B60B 1/0223 |
| | | 301/55 |
| 2004/0069385 A1* | 4/2004 | Timoney .................. B60C 7/18 |
| | | 152/69 |
| 2006/0103231 A1* | 5/2006 | Fioravantil ........... B60B 1/0223 |
| | | 301/55 |
| 2010/0078987 A1* | 4/2010 | Lubecki .................. B60B 1/003 |
| | | 301/56 |
| 2011/0101768 A1* | 5/2011 | Schlanger ............... B60B 1/003 |
| | | 301/56 |
| 2013/0233458 A1* | 9/2013 | Meraldi .................. B60B 9/26 |
| | | 152/5 |
| 2013/0340902 A1 | 12/2013 | Kemeny |
| 2014/0060715 A1 | 3/2014 | Winshtein et al. |

\* cited by examiner

NON-PNEUMATIC TIRE INCLUDING SUPPORT MEMBERS HAVING TENSION MEMBER

TECHNICAL FIELD

The present disclosure relates to non-pneumatic tires, and more particularly, to non-pneumatic tires including support members having a tension member.

BACKGROUND

Machines, such as either self-propelled vehicles or vehicles that are pushed or pulled, often include wheels for facilitating travel across terrain. Such wheels often include a tire to protect a rim or hub of the wheel, to provide cushioning for improved comfort or protection of the operator, passengers or cargo, and to provide enhanced traction via a tread of the tire. Non-pneumatic tires are an example of such tires.

Non-pneumatic tires, such as solid tires or tires not retaining pressurized air or gas, may have advantages relative to pneumatic tires because they do not retain air or gas under pressure. However, non-pneumatic tires may suffer from a number of possible drawbacks. For example, non-pneumatic tires may be relatively heavy and may not have a sufficient ability to provide a desired level of cushioning. For example, some non-pneumatic tires may provide little, if any, cushioning, potentially resulting in discomfort for vehicle occupants and/or damage to cargo. In addition, some non-pneumatic tires may not be able to maintain a desired level of cushioning when the load changes on the tire. In particular, if the structure of the non-pneumatic tire provides the desired level of cushioning for a given load, it may not be able to continue to provide the desired level of cushioning if the load is changed. For example, if the load is increased, the structure of the non-pneumatic tire may collapse, resulting in a loss of the desired level of cushioning or potential damage to the tire. If the load is decreased, the level of cushioning may also decrease, resulting in an undesirable reduction in comfort and/or protection. In addition, conventional non-pneumatic tires that provide adequate cushioning may not be able to maintain the desired vehicle ride height when loaded due to collapse of the tire under the load. Thus, it may be desirable to provide a non-pneumatic tire that provides a desired combination of support and cushioning across changing loads.

An example of a non-pneumatic tire is disclosed in U.S. Patent Application Publication No. US 2013/0340902 A1 to Kemeny ("the '902 publication"). In particular, the '902 publication discloses shock-absorbers used as wheel-spokes between a wheel-hub and a rigid rim. According to the '902 publication, the compliance of the shock-absorbers is commensurate with that of a comparable inflated tire, but optimized passively or actively circumferentially, vertically, and laterally. The gas or liquid of the shock-absorbers may be interconnected and cooled, and soft and hard driving may be controlled manually or by a computer on the fly.

Although the non-pneumatic tire disclosed in the '902 publication may purportedly provide controllable levels of shock-absorption, it may suffer from a number of drawbacks. For example, the tire disclosed in the '902 publication is very complex and thus may be prohibitively expensive and suffer from unreliability, particularly when used in harsh environments or under demanding operating conditions. Further, the tire may be relatively difficult or expensive to manufacture on a large scale due to the mechanical interconnections between parts.

The non-pneumatic tires disclosed herein may be directed to mitigating or overcoming one or more of the possible drawbacks set forth above.

SUMMARY

In one aspect, the present disclosure is directed to a non-pneumatic tire. The non-pneumatic tire may include a hub configured to be coupled to a machine, an outer circumferential barrier radially spaced from the hub and configured to be associated with a tread portion of the tire, and a plurality of support members extending between the hub and the outer circumferential barrier and being configured to support a load on the hub in tension. At least some of the plurality of support members may include at least one tension member coupled to one of the hub and the outer circumferential barrier, and an intermediate member coupled to the at least one tension member and one of the hub and the outer circumferential barrier. The at least one tension member may be configured not to transmit compressive load to the intermediate member.

In another aspect, a non-pneumatic tire may include a hub configured to be coupled to a machine, an outer circumferential barrier radially spaced from the hub and configured to be associated with a tread portion of the tire, and a plurality of support members extending between the hub and the outer circumferential barrier and being configured to support a load on the hub in tension. At least some of the plurality of support members may include a first tension member coupled to the hub, an intermediate member coupled to the first tension member, and a second tension member coupled to the intermediate member and the outer circumferential barrier. At least one of the first tension member and the second tension member may be formed from a first material, and the intermediate member may be formed from a second material different than the first material, such that the first tension member and the second tension member are configured to not transmit compressive load to the intermediate member when a compressive load is applied to at least one of the first tension member and the second tension member.

In still a further aspect, a non-pneumatic tire may include a hub configured to be coupled to a machine, an outer circumferential barrier radially spaced from the hub and configured to be associated with a tread portion of the tire, and a plurality of support members extending between the hub and the outer circumferential barrier and being configured to support a load on the hub in tension. At least some of the plurality of support members may include a first tension member coupled to the hub, an intermediate member coupled to the first tension member, and a second tension member coupled to the intermediate member and the outer circumferential barrier. At least one of the first tension member and the second tension member may be formed from a first material, and the intermediate member may be formed from a second material different than the first material. At least one of the first tension member and the second tension member may be configured to at least one of bend and buckle when a compressive load is applied to the support member, so that the compressive load is not transmitted to the intermediate member.

DETAILED DESCRIPTION

The exemplary tires disclosed herein may be used, for example, for machines configured to travel across terrain. An example of such a machine is a wheel loader. However, the machines may include any type of ground-borne vehicle, such as, for example, an automobile, a truck, an agricultural vehicle, and/or a construction vehicle, such as, for example, a dozer, a skid-steer loader, an excavator, a grader, an on-highway truck, an off-highway truck, and/or any other vehicle type known to a person skilled in the art. In addition to self-propelled machines, machines may be any device configured to travel across terrain via assistance or propulsion from another machine.

Figure 1:
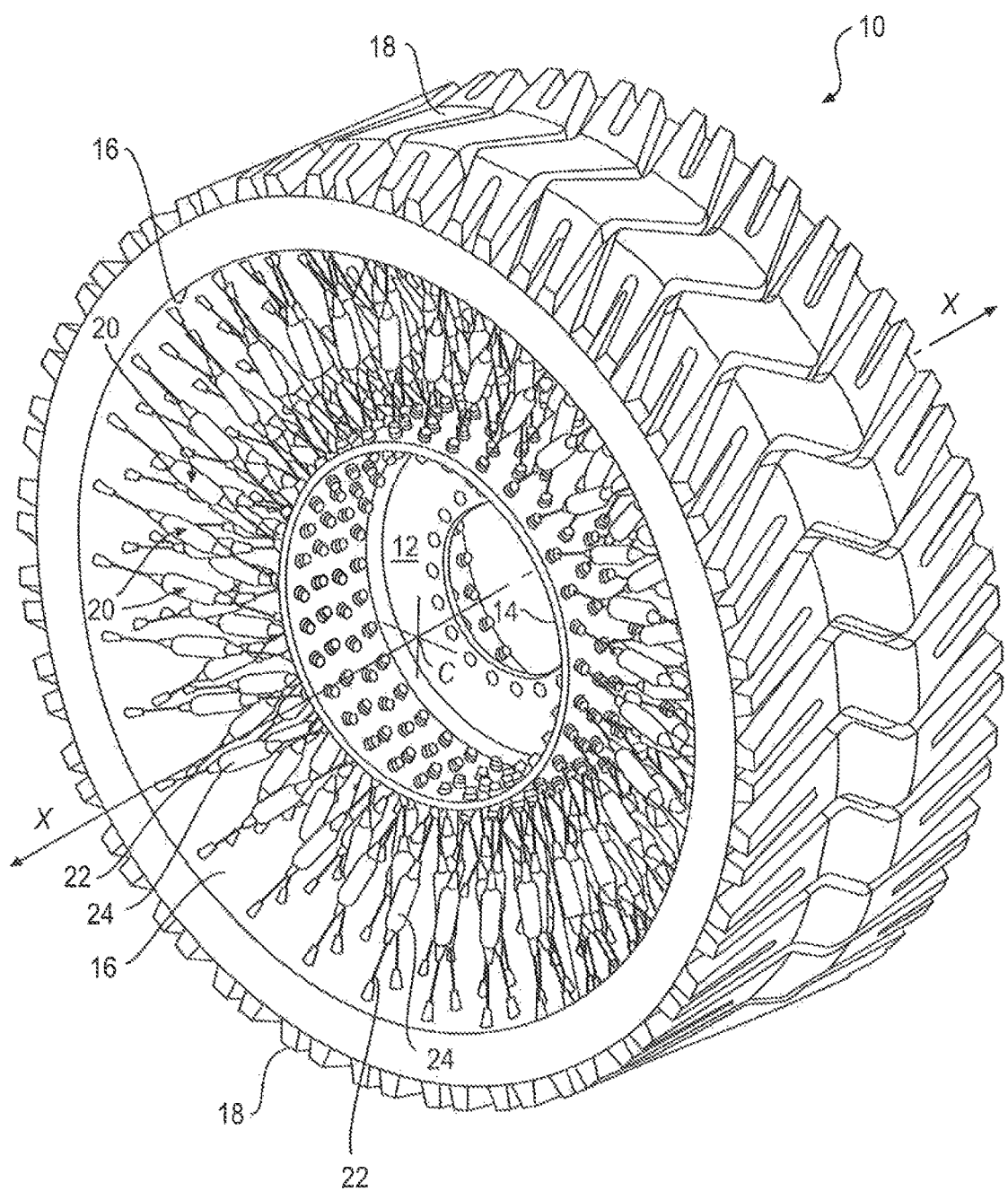
FIG. 1 is a perspective view of an exemplary embodiment of a non-pneumatic tire.

FIG. 1 shows an exemplary embodiment of a non-pneumatic tire 10 including an exemplary hub 12 configured to be coupled to a machine, for example, to a powertrain of a machine. Exemplary hub 12 shown includes an inner circumferential barrier 14. Hub 12 and/or inner circumferential barrier 14 may be configured to facilitate coupling of hub 12 to inner circumferential barrier 14, so that torque may be transferred between hub 12 and inner circumferential barrier 14. For example, inner circumferential barrier 14 may either be integrally formed as a single, monolithic piece with the remainder of hub 12, for example, via metal stamping, or may be formed separately and thereafter coupled to the remainder of hub 12 via any known coupling structures and methods, such as, for example, welding, bonding, and/or fasteners, such as bolts, rivets, or screws.

Exemplary tire 10 also includes an outer circumferential barrier 16 radially spaced from, and radially exterior relative to, inner circumferential barrier 14. Outer circumferential barrier 16 may be configured to be associated with a tread portion 18 of tire 10. Tread portion 18 of tire 10 may be configured to improve traction of tire 10 at the interface between tire 10 and the terrain across which tire 10 rolls about an axis of rotation X extending through a center C of tire 10. According to some embodiments, outer circumferential barrier 16 may take the form of a shear band configured to provide a relatively rigid annular ring.

Exemplary tire 10 also includes a plurality of support members 20 extending between inner circumferential barrier 14 and outer circumferential barrier 16. For example, in the exemplary embodiment shown, support members 20 extend generally radially, but not necessarily in a direction parallel to radial lines extending away from center C of tire 10.

Support members 20 are configured to couple inner circumferential barrier 14 and outer circumferential barrier 16 to one another.

According to some embodiments, outer circumferential barrier 16 and/or tread portion 18 may be integrally formed as a single, monolithic piece, for example, via molding. However, it is also contemplated that outer circumferential barrier 16 and/or tread portion 18 may be formed separately and thereafter coupled to one another via any known coupling structures and methods, such as, for example, welding, bonding, and/or fasteners, such as bolts, rivets, or screws. According to some embodiments, outer circumferential barrier 16 and tread portion 18 may be separately pre-formed and placed together in a mold that is heated to cure the outer circumferential barrier 16 and tread portion 18 as a single piece. For example, outer circumferential barrier 16 and tread portion 18 may be green-cured (i.e., heated a sufficient amount to be partially cured) and thereafter placed in the mold together and heated to a sufficient temperature and for a sufficient duration to complete the curing process.

Tire 10 may be configured to provide a desired amount of traction and cushioning between a machine supported by one or more tires 10 and the terrain. For example, inner circumferential barrier 14, support members 20, outer circumferential barrier 16, and tread portion 18 may be configured to support a machine in a loaded, partially loaded, and empty condition, such that a desired amount of traction and/or cushioning is provided for the machine, regardless of the load.

For example, if the machine is a wheel loader, when a bucket of the wheel loader is empty, the load on one or more of tires 10 may range from about 60,000 lbs. to about 160,000 lbs. (e.g., 120,000 lbs.) In contrast, with the bucket loaded with material, the load on one or more of tires 10 may range from about 200,000 lbs. to about 400,000 lbs. (e.g., 350,000 lbs.). Tire 10 may be configured to provide a desired level of traction and cushioning, regardless of whether the bucket is loaded, partially loaded, or empty. For smaller machines, correspondingly lower loads are contemplated. For example, for a skid-steer loader, the load on one or more of tires 10 may range from about 1,000 lbs. empty to about 3,000 lbs. (e.g., 2,400 lbs.) loaded. Tire 10 may be configured to provide a desired level of traction and cushioning for smaller machines.

Figure 2:
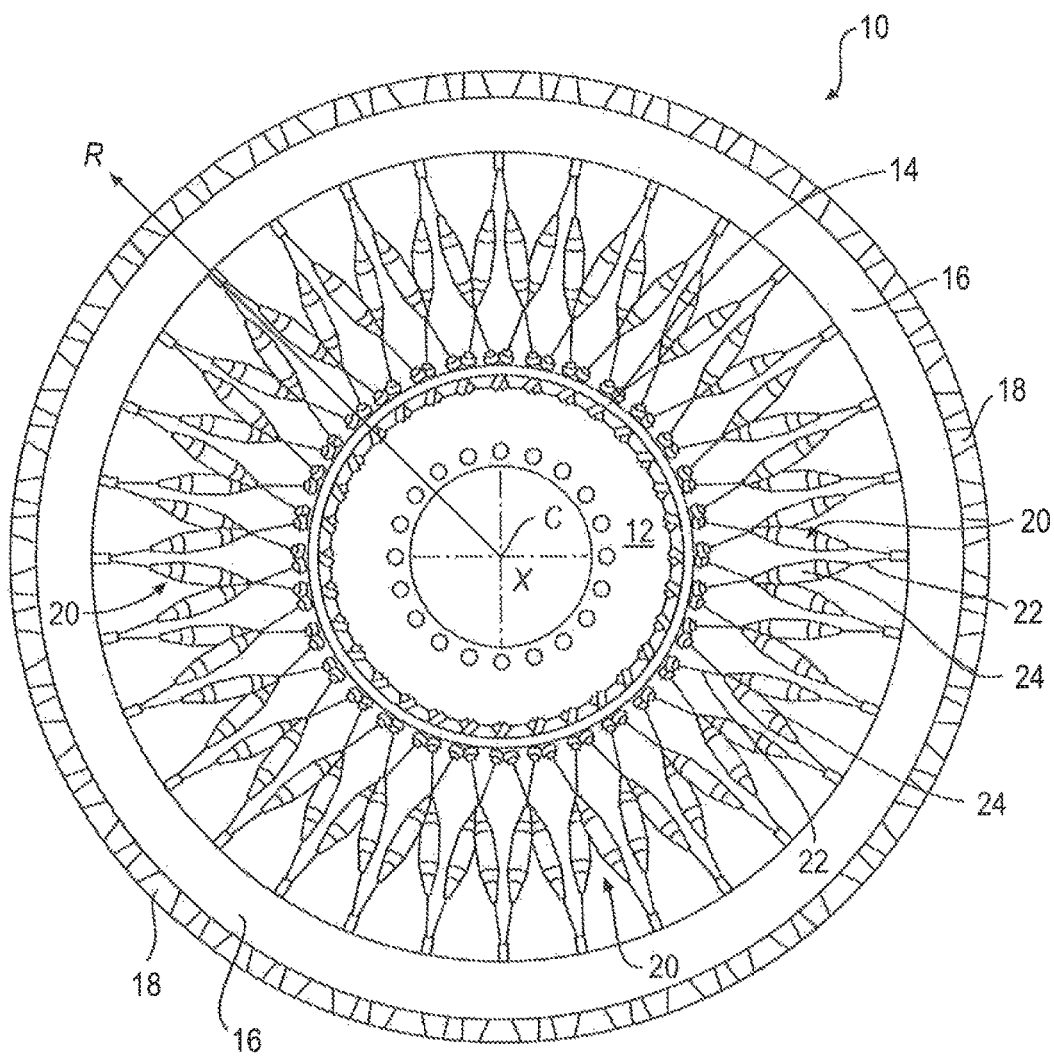
FIG. 2 is a side view of the exemplary non-pneumatic tire shown in FIG. 1.
Figure 3:
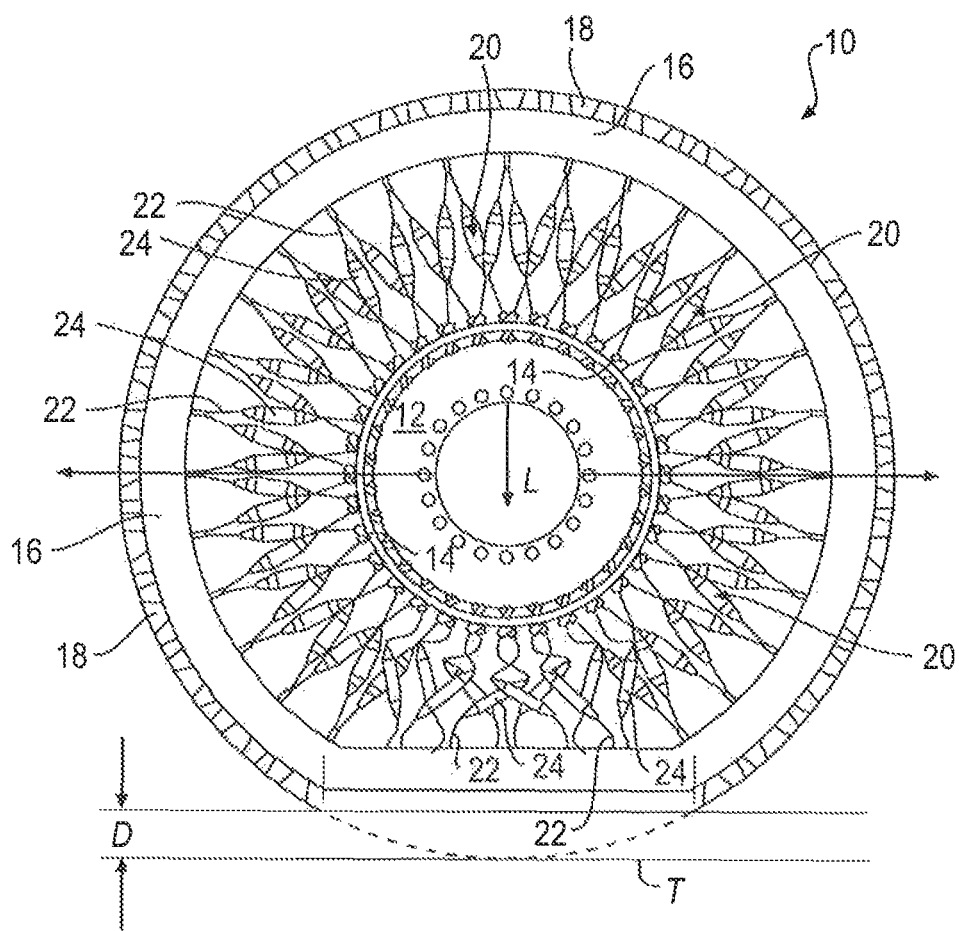
FIG. 3 a side view of the exemplary non-pneumatic tire shown in FIG. 1 in an exemplary loaded condition.

According to some embodiments, tire 10 may be configured such that it responds to load in a manner similar to a tension wheel. For example, load supported by tire 10 at hub 12 may be supported primarily in tension rather than primarily in compression. Referring to FIGS. 2 and 3, for example, a load L supported by tire 10 acts at hub 12, which, in turn, acts on inner circumferential barrier 14. Inner circumferential barrier 14 pulls downward on support member 20 located above hub 12, such that support members 20 above hub 12 are in tension. In contrast, support members 20 located below hub 12 do not support load, which would be in compression. Thus, outer circumferential barrier 16 and tread portion 18 located above hub 12, support the load on hub 12 in tension via support members 20 located above hub 12.

According to some embodiments, support members 20 include at least one tension member 22 coupled to one of hub 12 (e.g., via inner circumferential barrier 14) and outer circumferential barrier 16, and an intermediate member 24 coupled to tension member 22 and one of hub 12 (e.g., via inner circumferential barrier 14) and outer circumferential barrier 16. According to some embodiments, for example, as shown in FIG. 3, the at least one tension member 22 is configured not to transmit compressive load to intermediate member 24. For example, at least one tension member 22 and intermediate member 24 are coupled to one another in an end-to-end manner in series.

As shown in FIG. 3, according to some embodiments, tire 10 may be configured such that as load L acts on hub 12, a portion of tire 10 below hub 12 deflects and provides cushion as tire 10 supports load L and/or as tire 10 rolls across the terrain T. For example, relative to tire 10 being perfectly circular, for example, as shown in FIG. 2, a deflection D (shown in FIG. 3) relative to perfectly circular may occur. As tire 12 compresses and slightly deflects below hub 12, hub 12 is supported from above by the portion of outer circumferential barrier 16 and/or tread portion 18 above hub 12 via support members 20 coupled to outer circumferential barrier 16 at the portion above hub 12. Support members 20 may be configured to stretch, thereby permitting outer circumferential barrier 16 and tread portion 18 to slightly deform.

For example, as shown in FIG. 3, the portion of outer circumferential barrier 16 and tread portion 18 below hub 12 may slightly flatten because support members 20 are configured such that they do not support load in compression. For example, in the exemplary embodiment shown, at least some of tension members 22 below hub 12 bend and/or buckle, and thus, intermediate members 24 associated with the bending and/or buckling tension members 22 are not subjected to bending or compression load. Above hub 12, support members 20 are in tension and according to some embodiments, are configured to stretch, thereby permitting slight deformation to counteract the slight flattening of outer circumferential barrier 16 and tread portion 18 below hub 12 at terrain T. For example, because the slightly flattened portion of outer circumferential barrier 16 and tread portion 18 is closer to hub 12, in order to maintain the circumferential distance around tire 10, support members 20 above hub 12 are configured to stretch, so that outer circumferential barrier 16 and tread portion 18 above the flattened portion may deform a sufficient amount for the circumferential distance around tire 10 to be maintained. For example, according to an exemplary embodiment, if the deflection D is 100 millimeters, at least some of support members 20 above hub 12 would be expected to stretch about 5 millimeters in order to accommodate the increase in radial distance between hub 12 and outer circumferential barrier 16. Other amounts of deflection D and stretching are contemplated.

According to some embodiments, support members 20 are configured such that intermediate members 24 are not subjected to compression and/or bending loads. For example, a tension member 22 associated with a respective intermediate member 24 is configured such that tension member 22 transmits only tension loads and not compression loads and/or bending loads to the respective intermediate member 24. As a result, intermediate members 24, according to some embodiments, will be subjected to load cycling between zero load and some positive uniaxial tension load. Such a cyclic loading profile may result in a relatively higher fatigue life for intermediate members 24, for example, depending on the material characteristics of intermediate members 24. If intermediate members 24 are formed from a material or materials that have a significantly higher fatigue life in tension as compared to fatigue life in compression and/or bending, or that have a significantly higher fatigue life when they are not subjected to reversible load cycling that repeatedly transitions between tension loading and compression and/or bending loading, it may be beneficial to prevent reversible load cycling. According to some embodiments, tension member 22 is more flexible than intermediate member 24, such that when support member 20 is loaded in compression, tension member 22 bends and intermediate member 24 does not bend (e.g., because it is not subjected the compression load).

Figure 4:
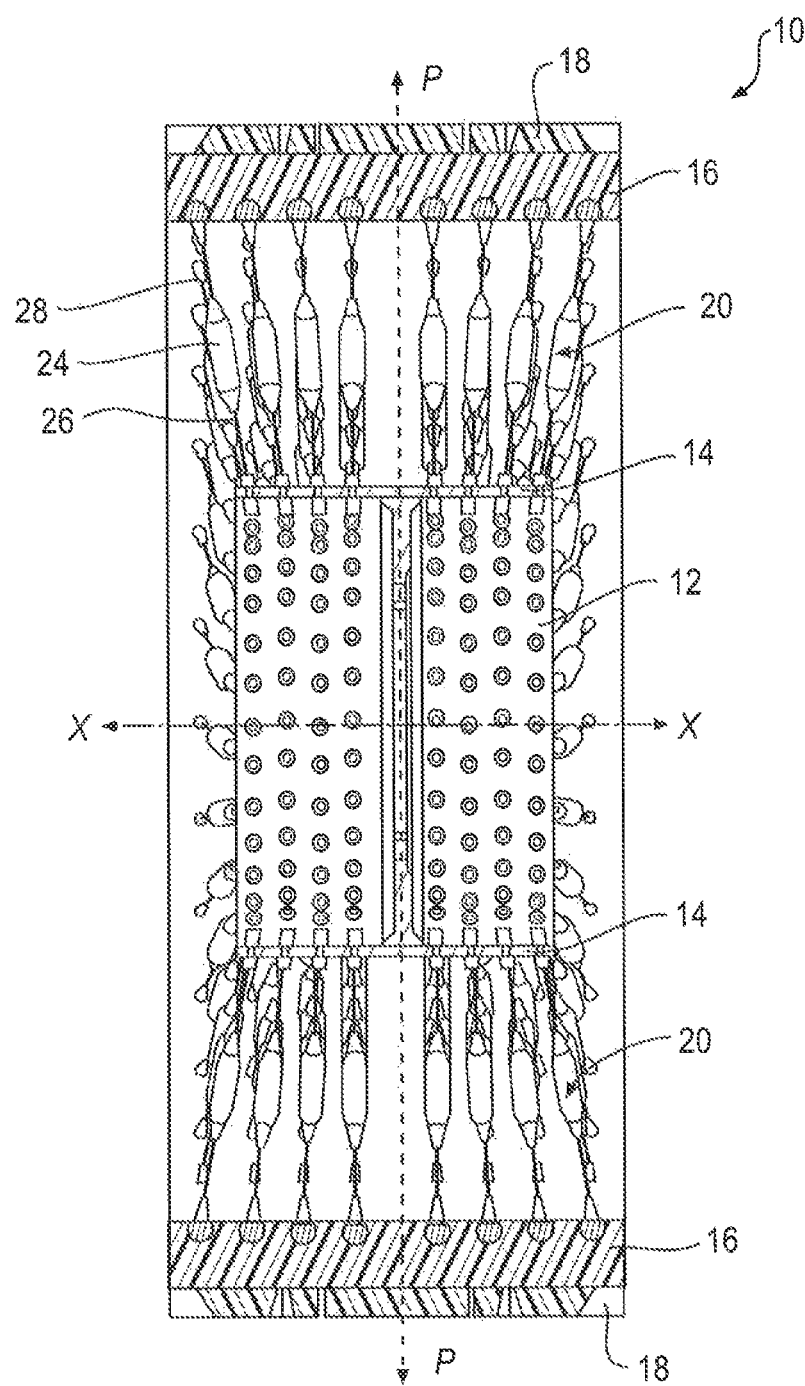
FIG. 4 is a cross-sectional view of the exemplary non-pneumatic tire shown in FIG. 1.
Figure 5:
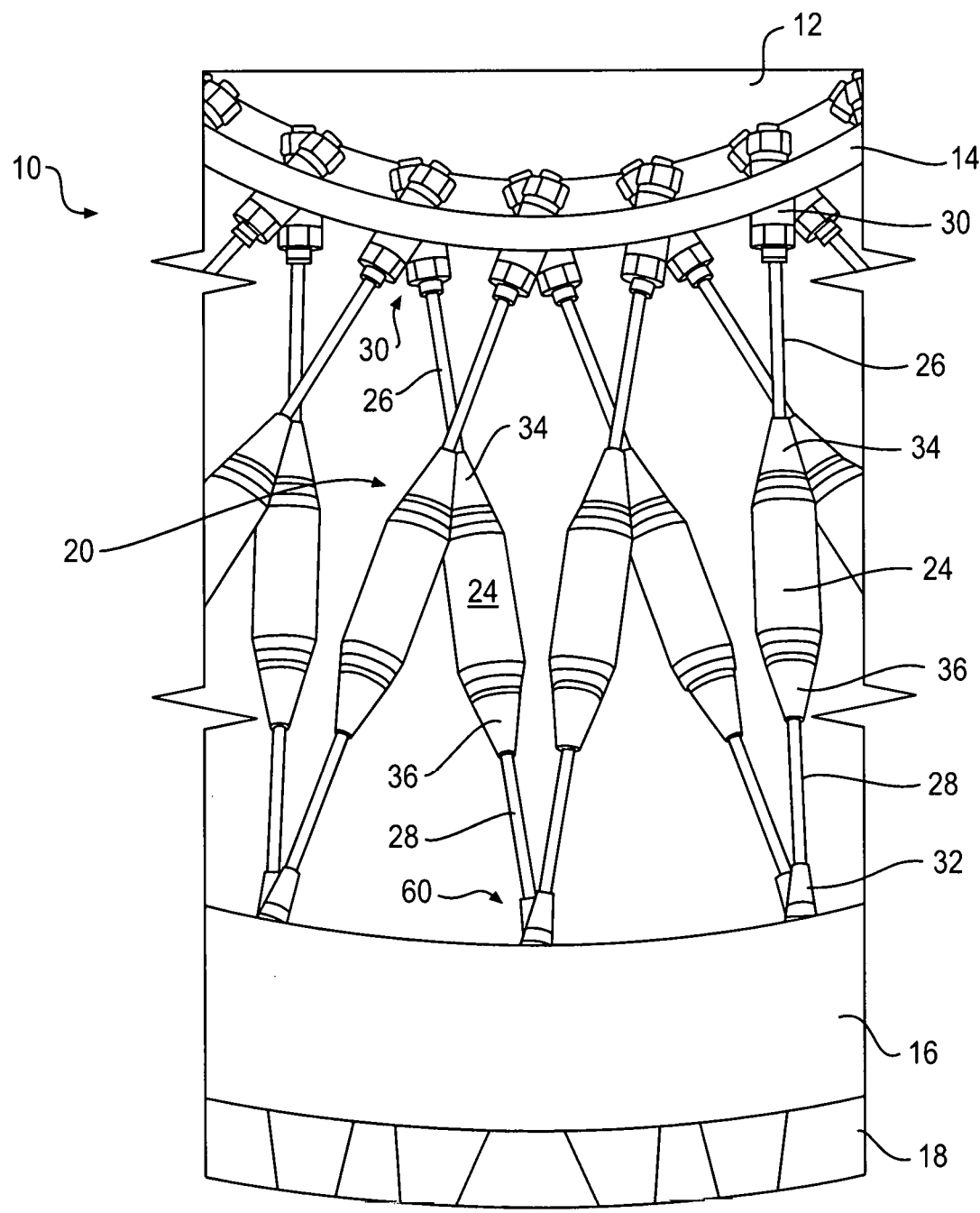
FIG. 5 is a detailed, partial side view of the exemplary non-pneumatic tire shown in FIG. 1.

According to some embodiments of support members 20, for example, as shown in FIGS. 4 and 5, each support member 20 includes a first tension member 26 and a second tension member 28. As shown, first tension member 26 is coupled to hub 12 (e.g., via inner circumferential barrier 14) and a respective intermediate member 24, and second tension member 28 is coupled to the respective intermediate member 24 and outer circumferential barrier 16. For example, first tension member 26, intermediate member 24, and second tension member 28 are coupled to one another, such that the respective longitudinal axis of each of first tension member 26, intermediate member 24, and second tension member 28 are aligned (e.g., co-linear), and coupled to one another in an end-to-end, series manner, for example, as shown in FIGS. 5 and 6.

According to some embodiments, intermediate members 24 may have a circular cross-section viewed in a direction of a longitudinal axis of intermediate members 24. Other cross-sectional shapes are contemplated. Intermediate members 24 may be shaped and/or dimensioned to provide sufficient tensile strength and/or fatigue life. According to some embodiments, intermediate members 24 may be formed from at least one polymer, such as, for example, polyurethane, natural rubber, synthetic rubber, and combinations thereof. According to some embodiments, intermediate members 24 may be reinforced with reinforcing members, such as, for example, synthetic reinforcing fibers, such as para-aramid synthetic fibers, such as poly-paraphenylene terephthalamide (e.g., KEVLAR®), or any other fibers having a suitable tensile strength.

In the exemplary embodiment shown, tire 10 includes a first anchor 30 coupled to first tension member 26 and hub 12, and a second anchor 32 coupled to second tension member 28 and outer circumferential barrier 16, as shown in FIGS. 5-8. For example, first anchor 30 is coupled to inner circumferential barrier 14 and first tension member 26, thereby coupling a first end of an associated support member 20 to hub 12. Second anchor 32 couples a second end of the associated support member 20 to outer circumferential barrier 16. According to some embodiments, a first coupler 34 is coupled to first tension member 26 and intermediate member 24, and a second coupler 36 is coupled to intermediate member 24 and second tension member 28, thereby coupling first tension member 26, intermediate member 24, and second tension member 28 to one another.

Figure 6:
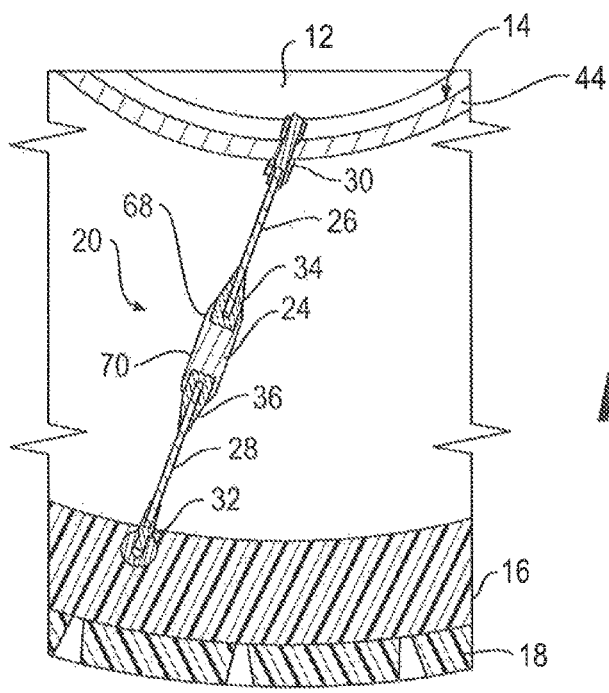
FIG. 6 is a detailed, partial side section view of a portion of the exemplary non-pneumatic tire shown in FIG. 1.
Figure 7:
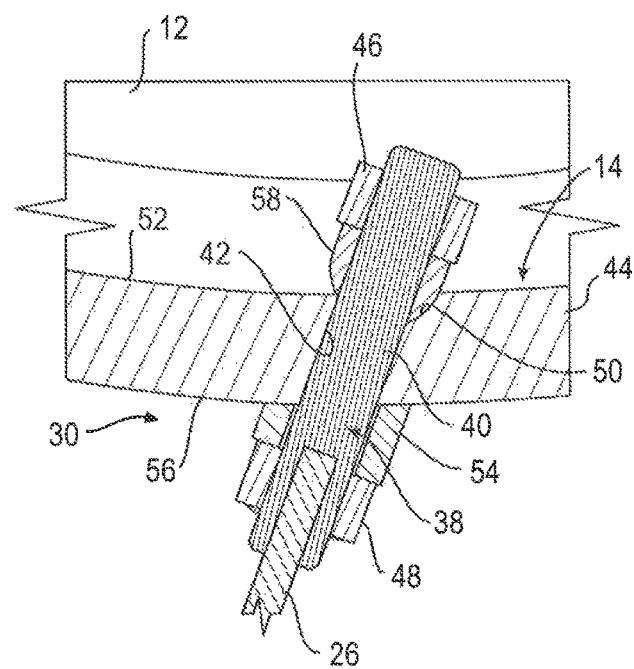
FIG. 7 is a detailed, partial side section view of a portion of the exemplary non-pneumatic tire shown in FIG. 6.

According to some embodiments, first anchor 30 may include a cable end 38 configured to be mechanically coupled to an end of first tension member 26 and provide a fastening structure for being coupled to hub 12, for example, via inner circumferential barrier 14, as shown in FIGS. 6 and 7. For example, cable end 38 may be a "crimp-on" type cable end configured to be clamped around an end of first tension member 26 remote from intermediate member 24 to provide a secure coupling. It is contemplated that cable end 38 may be coupled to first tension member 26 via any known coupling structures and methods, such as, for example, welding, bonding, and/or fasteners, such as bolts, rivets, or screws.

Cable end 38 may include a shank 40 configured to extend into hub 12 for coupling cable end 38 to hub 12. For example, shank 40 may be configured to extend though an aperture 42 in an annular flange 44 of inner circumferential barrier 14. In the exemplary embodiment shown in FIG. 7, shank 40 includes external threads configured to engage internal threads on a first nut 46 located radially internal to annular flange 44, and internal threads on a second nut 48 located radially external to annular flange 44. In the exemplary embodiment shown in FIG. 7, annular flange 44 includes a semi-spherical concave receiving surface 50 located surrounding aperture 42 on a radially facing inner surface 52. Exemplary first anchor 30 also includes a tapered washer 54 around shank 40 and between second nut 48 and a radially facing outer surface 56 of annular flange 44. Exemplary tapered washer 54 includes a first annular axial surface configured to abut an annular axial surface of second nut 48, and an opposite second annular axial surface oblique with respect to the first annular axial surface and configured to abut outer surface 56 of annular flange 44. Exemplary first anchor 30 also includes a semi-spherical washer 58 around shank 40 and between receiving surface 50 and first nut 46. Semi-spherical washer 58 includes a semi-spherical convex annular surface configured to abut receiving surface 50, and an opposite annular axial surface configured to abut an annular axial surface of first nut 46. In this exemplary configuration, first nut 46 and second nut 48 may be tightened to sandwich annular flange 44 between tapered washer 54 and semi-spherical washer 58 to thereby couple first tension member 26 to hub 12. Other configurations of cable end 38 are contemplated, such as, for example, a hook and loop configuration where first tension member 26 includes an end with a hook or a loop, and the other of a hook and a loop is coupled to inner circumferential barrier 14, so that the hook and loop can engage one another to couple first tension member 26 and inner circumferential barrier 14 to one another.

According to some embodiments, at least some of support members 20 extend between hub 12 and outer circumferential barrier 16 in a direction oblique with respect to a radial direction R (see FIG. 2) extending through axis of rotation X of tire 10 and a point at which a respective support member 20 is coupled to hub 12. For example, exemplary tapered washer 54 and semi-spherical washer 58 are configured to couple first tension member 26 to hub 12, such that first tension member 26 is not perpendicular to the surface of annular flange 44 at the point at which first tension member 26 is coupled to hub 12 (e.g., at aperture 42). In this exemplary manner, support member 20 is coupled between hub 12 and outer circumferential barrier 16 in an orientation such that support member 20 is not parallel to a radial direction extending from center C of tire 10 through the point at which first tension member 26 is coupled to annular flange 44. As a result of this exemplary configuration, support members 20, having a circumferentially extending component as they extend between inner circumferential barrier 14 and outer circumferential barrier 16, may transmit torque between hub 12 and outer circumferential barrier 16 more effectively as compared to support members that extend in a direction perpendicular to inner circumferential barrier 14 at the point at which the support member is coupled to hub 12.

Figure 8:
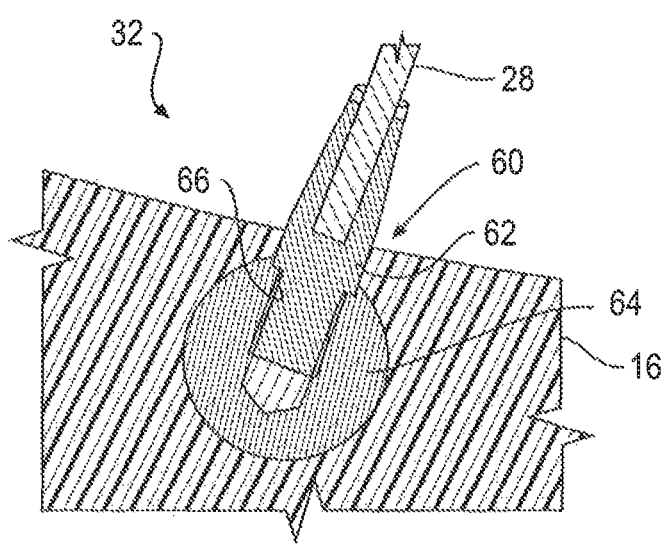
FIG. 8 is a detailed, partial side section view of another portion of the exemplary non-pneumatic tire shown in FIG. 6.

As shown in FIGS. 6 and 8, exemplary second anchor 32 is configured to couple second tension member to outer circumferential barrier 16. In the exemplary embodiment shown, second anchor 32 includes a cable end 60 configured to be mechanically coupled to an end of second tension member 28 and provide a fastening structure for being coupled to outer circumferential barrier 16. For example, cable end 60 may be a "crimp-on" type cable end configured to be clamped around an end of second tension member 26 remote from intermediate member 24 to provide a secure coupling. It is contemplated that cable end 60 may be coupled to second tension member 28 via any known coupling structures and methods, such as, for example, welding, bonding, and/or fasteners, such as bolts, rivets, or screws.

Exemplary cable end 60 may include a shank 62 configured to extend into outer circumferential barrier 16 for coupling cable end 60 to outer circumferential barrier 16. Exemplary second anchor 32 may also include a spherical anchor 64 embedded in outer circumferential barrier 16 and/or tread portion 18. Exemplary spherical anchor 64 includes an aperture 66 (e.g., a blind bore) extending diametrically into spherical anchor 64 and provided with internal threads. Shank 62 may include external threads configured engage internal threads of spherical anchor 64 to thereby couple second tension member 28 and outer circumferential barrier 16 to one another. It is contemplated that spherical anchor 64 may have configurations other than spherical, such as, for example, cubical, conical, or cylindrical.

According to some embodiments, spherical anchor 64 may be molded into outer circumferential barrier 16 and/or tread portion 18, for example, such that it is at least partially embedded therein. For example, spherical anchor 64 may be molded into outer circumferential barrier 16 and/or tread portion 18, such that a longitudinal axis of aperture 66 is substantially aligned with the longitudinal axes of second tension member 28, intermediate member 24, and/or first tension member 26. According to some embodiments, spherical anchor 64 may be formed from a metal, such as, for example, steel, stainless steel, and/or other similar materials, and one or more of outer circumferential barrier 16 and tread portion 18 may be at least partially formed from at least one polymer, such as, for example, polyurethane, natural rubber, synthetic rubber, and combinations thereof. Other similar materials are contemplated. Other configurations of cable end 60 are contemplated, such as, for example, a hook and loop configuration where second tension member 28 includes an end with a hook or a loop, and the other of a hook and a loop is coupled to outer circumferential barrier 16 and/or tread portion 18, so that the hook and loop can engage one another to couple second tension member 28 and outer circumferential barrier 16 to one another.

According to the exemplary embodiment shown in FIG. 6, first coupler 34 is configured to couple an end of first tension member 26 opposite first anchor 30 to a first end 68 of intermediate member 24. Second coupler 36 is configured to couple an end of second tension member 28 opposite second anchor 32 to a second end 70 of intermediate member 24 opposite first end 68 of intermediate member 24. First coupler 34 and/or second coupler 36 may include at least one of a chemical bond, a mechanical connection, and a "crimp-on" connection. For example, first coupler 34 and/or second coupler 36 may include a crimp-on connection between the coupler and the respective first tension member 34 and/or second tension member 36. Other forms of connection between tension members and respective couplers are contemplated, such as, for example, welding, bonding, and/or fasteners, such as bolts, rivets, or screws.

According to some embodiments, first coupler 34 and/or second coupler 36 may be coupled to first end 68 and second 70, respectively via an adhesive configured to provide a chemical bond between metal and a polymer. For example, first coupler 34 and/or second coupler 36 may be formed from metal, and intermediate member 24 may be at least partially formed from at least one polymer, such as, for example, polyurethane, natural rubber, synthetic rubber, and combinations thereof. Other similar materials are contemplated. According to some embodiments, an adhesive configured to provide a chemical bond between metal and a polymer marketed under the trademark CHEMLOK® may be used. Other known coupling structures and methods are contemplated, such as, for example, welding and/or fasteners, such as bolts, rivets, or screws.

According to some embodiments, first tension member 26 and/or second tension member 28 may include at least one of a cable and a strap. For example, one or more of tension members 26 and 28 may include a wire rope, for example, including a plurality of metal wires helically coiled around one another. Any suitable metal is contemplated. According to some embodiments, the cable may be formed from non-metals, such as synthetic reinforcing fibers, such as, for example, para-aramid synthetic fibers, such as poly-para-phenylene terephthalamide (e.g., KEVLAR®), or any other fibers having a suitable tensile strength and flexibility. According to some embodiments, first tension member 26 and/or second tension member 28 may include a strap formed from, for example, synthetic reinforcing fibers, such as those previously mentioned.

Figure 9:
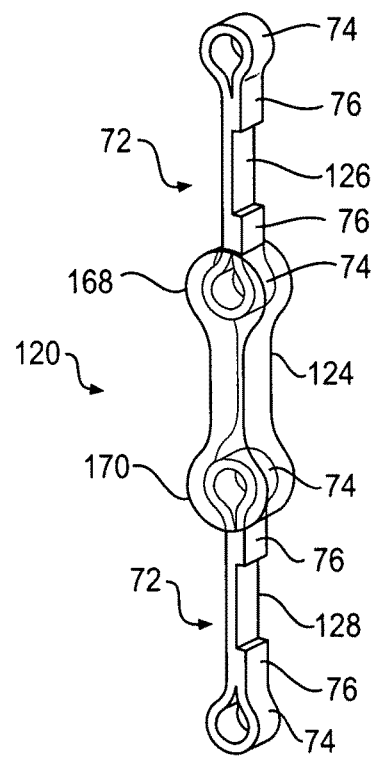
FIG. 9 is perspective view of an exemplary embodiment of a support member.
Figure 10:
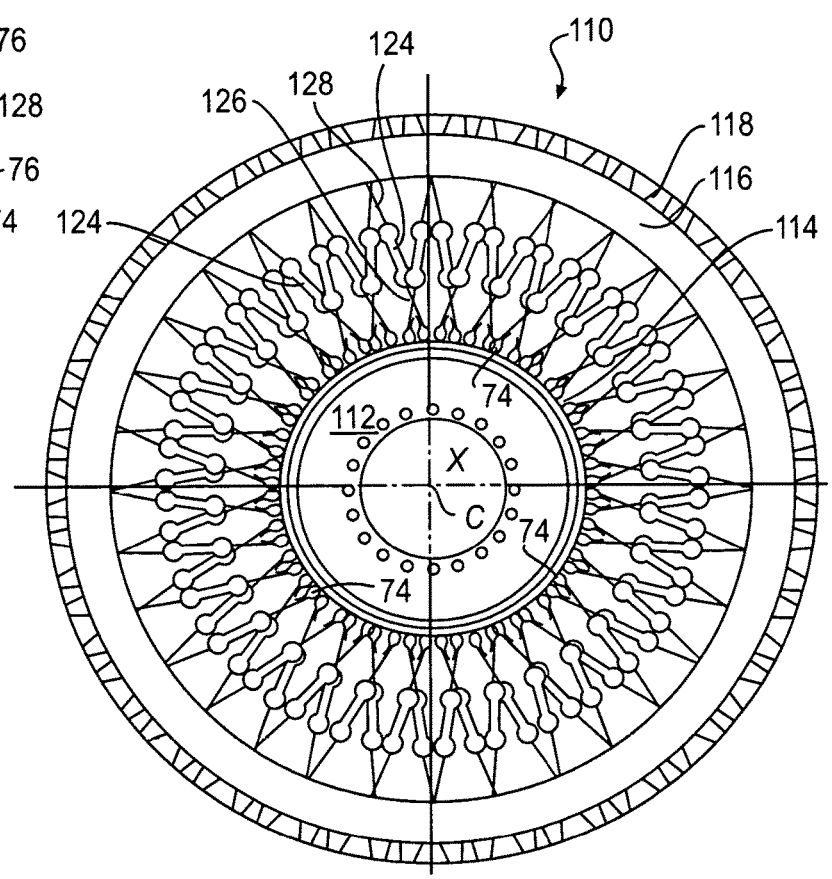
FIG. 10 is a side view of an exemplary embodiment of a non-pneumatic tire including a plurality of the exemplary support members shown in FIG. 9.

For example, in the exemplary embodiment shown in FIGS. 9 and 10, exemplary first tension member 126 and exemplary second tension member 128 are each a strap 72, and exemplary intermediate member 124 is over-molded at opposite ends 168, 170 onto each of the straps 72. For example, each of first tension member 126 and second tension member 128 shown in FIG. 9 is formed from strap 72 having a relatively flat cross-section. One or more ends of straps 72 include a loop 74 formed, for example, by the material of strap 72 being folded back on itself relative to the longitudinal direction of strap 72, with a tail 76 overlapping a portion of strap 72 to form loops 74. Tail 76 may be coupled to strap 72 by known connection methods, such as, for example, chemical bonding and/or coupling structures and methods, such as welding and/or fasteners, such as bolts, rivets, or screws. According to some embodiments, straps 72 may be formed from non-metals, such as synthetic reinforcing fibers, such as, for example, para-aramid synthetic fibers, such as poly-paraphenylene terephthalamide (e.g., KEVLAR®), or any other fibers having a suitable tensile strength and flexibility.

In the exemplary embodiment shown, intermediate member 124 may be formed from at least one polymer, such as, for example, polyurethane, natural rubber, synthetic rubber, and combinations thereof, and may be molded over and around one of loops 74 of a respective strap 72, such that the molded material substantially surrounds the respective loop 74 and flows into the interior of loop 74. Such an exemplary coupling may result in both a chemical bond and mechanical connection between strap 72 and intermediate member 124, for example, following the curing of intermediate member 124. One or more of first tension member 126 and second tension member 128 may be coupled to a respective intermediate member 124 in this exemplary manner, for example, to form the exemplary support member 120 shown in FIG. 9. According to some embodiments, the portions of straps 72 not coupled to intermediate member 124 may be at least partially coated with a protective material, such as, for example, at least one polymer, such as polyurethane, natural rubber, synthetic rubber, and combinations thereof.

FIG. 10 shows an exemplary tire 110 including a plurality of the exemplary support members 120 shown in FIG. 9. According to some embodiments, loops 74 at ends of tension members 126 and 128 opposite respective intermediate member 124 may be configured to be anchored in hub 112 and outer circumferential barrier 116. For example, inner circumferential barrier 114 and/or outer circumferential barrier 116 may include hook structures configured to engage a respective loop 74, thereby anchoring support members 120 between hub 112 and outer circumferential barrier 116. According to some embodiments, the end of second tension member 128 remote from intermediate member 124 may be molded into outer circumferential barrier 116 and/or tread portion 118, thereby embedding the respective loops 74 in outer circumferential barrier 116 and/or tread portion 118.

According to some embodiments, at least some of support members 20 cross one another as viewed in a direction perpendicular to equatorial plane P (see FIG. 4) of tire 10 as respective support members 20 extend between hub 12 and outer circumferential barrier 16. For example, as shown in FIGS. 2 and 5, pairs of circumferentially adjacent support members 20 cross one another at a point along the length of the respective support member 20 between hub 12 and outer circumferential barrier 16. In the exemplary embodiment shown, the pairs of support members 20 cross at a point along the length of the respective support members 20 adjacent the coupling between intermediate member 24 and first tension member 26. Crossing at other points along the length is contemplated. This exemplary crossing configuration may result in transmission of torque between hub 12 and outer circumferential barrier 16 more effectively as compared to support members that extend in a direction perpendicular to inner circumferential barrier 14 at the point at which the support member 20 is coupled to hub 12 (i.e., such that support members 20 do not cross one another).

As shown in FIG. 4, according to some embodiments, at least some of support members 20 extend in a direction oblique with respect to equatorial plane P of tire 10 extending perpendicular with respect to axis of rotation X of tire 10. For example, as shown in FIG. 4, support members 20 remote from equatorial plane P extend at an oblique angle with respect to equatorial plane P, for example, such that an end of respective support members 20 adjacent hub 12 is closer to equatorial plane P than an opposite end of respective support members 20 adjacent outer circumferential barrier 16. This exemplary configuration may result in greater lateral stiffness of tire 10 as compared to a tire having all support members parallel to equatorial plane P. In addition, such an exemplary configuration may result in a hub 12 that is narrower than tread portion 18 in a direction parallel to axis of rotation X (i.e., the axial direction).

According to some embodiments, at least one of intermediate member 24, outer circumferential barrier 16, and tread portion 18 may be at least partially formed from at least one polymer, such as, for example, polyurethane, natural rubber, synthetic rubber, and combinations thereof. According to some embodiments, at least one of intermediate member 24, outer circumferential barrier 16, and tread portion 18 may be reinforced with one or more reinforcing members, such as, for example, synthetic reinforcing fibers, such as para-aramid synthetic fibers, such as poly-paraphenylene terephthalamide (e.g., KEVLAR®), or any other fibers having a suitable tensile strength.

INDUSTRIAL APPLICABILITY

The non-pneumatic tires disclosed herein may be used with any machines, including self-propelled vehicles or vehicles intended to be pushed or pulled by another machine. According to some embodiments, the non-pneumatic tires disclosed herein may overcome or mitigate potential drawbacks associated with prior non-pneumatic tires.

For example, relative to prior non-pneumatic tires, the non-pneumatic tires disclosed herein may be relatively lighter in weight than other non-pneumatic tires designed to support similar loads, and/or may have an ability to provide a desired level of cushioning, regardless of whether the load on the tire changes significantly. This may be desirable when non-pneumatic tires are installed on machines that carry loads of widely varying magnitude. For example, the tires of a wheel loader or haul truck may be subjected to a relatively light load when not carrying a load of material, but a relatively high load when carrying a load of material. The non-pneumatic tires disclosed herein may be able to provide a desirable level of cushioning and/or traction in both conditions.

It will be apparent to those skilled in the art that various modifications and variations can be made to the exemplary disclosed non-pneumatic tires. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A non-pneumatic tire comprising:
a hub configured to be coupled to a machine;
an outer circumferential barrier radially spaced from the hub and configured to be associated with a tread portion of the tire; and
a plurality of support members extending between the hub and the outer circumferential barrier and being configured to support a load on the hub in tension, wherein at least some of the plurality of support members include:
a first tension member coupled to the hub,
an intermediate member coupled to the first tension member, and
a second tension member coupled to the intermediate member and the outer circumferential barrier,
wherein the first tension member and the second tension member are configured not to transmit compressive load to the intermediate member, and
wherein respective longitudinal axes of each of the first tension member, the intermediate member coupled to the first tension member, and the second tension member coupled to the intermediate member are aligned and co-linear at least when the tire is not subjected to a load.

2. The non-pneumatic tire of claim 1, further including a first anchor coupled to the first tension member and the hub, and a second anchor coupled to the second tension member and the outer circumferential barrier.

3. The non-pneumatic tire of claim 1, further including a first coupler coupled to the first tension member and the intermediate member, and a second coupler coupled to the intermediate member and the second tension member.

4. The non-pneumatic tire of claim 3, wherein at least one of the first and second couplers includes a chemical bond.

5. The non-pneumatic tire of claim 3, wherein at least one of the first and second couplers includes a mechanical connection.

6. The non-pneumatic tire of claim 5, wherein at least one of the first and second couplers includes a crimp-on connection.

7. The non-pneumatic tire of claim 1, wherein at least one of the first tension member and second tension member includes at least one of a cable and a strap.

8. The non-pneumatic tire of claim 7, wherein the at least one tension member is a strap, and wherein the intermediate member is over-molded onto the strap.

9. The non-pneumatic tire of claim 1, wherein at least some of the plurality of support members extend between the hub and the outer circumferential barrier in a direction oblique with respect to a radial direction extending through an axis of rotation of the tire and a point at which a respective support member is coupled to the hub.

10. The non-pneumatic tire of claim 9, wherein at least some of the plurality of support members cross one another as viewed in a direction perpendicular to an equatorial plane of the tire as the respective support members extend between the hub and the outer circumferential barrier.

11. The non-pneumatic tire of claim 10, wherein at least some of the plurality of support members extend in a direction oblique with respect to an equatorial plane of the tire extending perpendicular with respect to an axis of rotation of the tire.

12. The non-pneumatic tire of claim 1, wherein at least one of the intermediate member, the outer circumferential barrier, and the tread portion is at least partially formed from at least one polymer selected from the group consisting of polyurethane, natural rubber, and synthetic rubber.

13. A non-pneumatic tire comprising:
a hub configured to be coupled to a machine;
an outer circumferential barrier radially spaced from the hub and configured to be associated with a tread portion of the tire; and
a plurality of support members extending between the hub and the outer circumferential barrier and being configured to support a load on the hub in tension, wherein at least some of the plurality of support members include:
a first tension member coupled to the hub,
an intermediate member coupled to the first tension member, and
a second tension member coupled to the intermediate member and the outer circumferential barrier,
wherein at least one of the first tension member and the second tension member is formed from a first material, and the intermediate member is formed from a second material different than the first material, such that the first tension member and the second tension member are configured to not transmit compressive load to the intermediate member when a compressive load is applied to at least one of the first tension member and the second tension member, and
wherein respective longitudinal axes of each of the first tension member, the intermediate member coupled to the first tension member, and the second tension member coupled to the intermediate member are aligned and co-linear at least when the tire is not subjected to a load.

14. The non-pneumatic tire of claim 13, wherein at least one of the first tension member and the second tension member includes at least one of a cable and a strap.

15. The non-pneumatic tire of claim 14, wherein at least one of the first tension member and the second tension member is a strap, and wherein the intermediate member is over-molded onto the strap.

16. The non-pneumatic tire of claim 15, wherein the first material includes synthetic reinforcing fibers, and the second material includes at least one polymer selected from the group consisting of polyurethane, natural rubber, and synthetic rubber.

17. The non-pneumatic tire of claim 14, wherein at least one of the first tension member and the second tension member is a cable including one of wire rope and synthetic reinforcing fibers.

18. A non-pneumatic tire comprising:
a hub configured to be coupled to a machine;
an outer circumferential barrier radially spaced from the hub and configured to be associated with a tread portion of the tire; and
a plurality of support members extending between the hub and the outer circumferential barrier and being configured to support a load on the hub in tension, wherein at least some of the plurality of support members include:
a first tension member coupled to the hub,
an intermediate member coupled to the first tension member, and
a second tension member coupled to the intermediate member and the outer circumferential barrier,
wherein at least one of the first tension member and the second tension member is formed from a first material, and the intermediate member is formed from a second material different than the first material,
wherein at least one of the first tension member and the second tension member is configured to at least one of bend and buckle when a compressive load is applied to the support member, so that the compressive load is not transmitted to the intermediate member, and
wherein respective longitudinal axes of each of the first tension member, the intermediate member coupled to the first tension member, and the second tension member coupled to the intermediate member are aligned and co-linear at least when the tire is not subjected to a load.

19. The non-pneumatic tire of claim 18, wherein at least one of the first tension member and the second tension member includes at least one of a cable and a strap, and the second material includes at least one polymer selected from the group consisting of polyurethane, natural rubber, and synthetic rubber.

* * * * *